June 2, 1942.  KARL-GEORG HOLSTEN  2,285,091
GONIOMETER
Filed Jan. 16, 1941

Inventor:
Karl-Georg Holsten

Patented June 2, 1942

2,285,091

UNITED STATES PATENT OFFICE 2,285,091

GONIOMETER

Karl-Georg Holsten, Berlin, Germany, assignor to C. Lorenz Aktiengesellschaft, Berlin-Tempelhof, Germany, a company Application January 16, 1941, Serial No. 374,651
In Germany January 16, 1940

1 Claim. (Cl. 250—11)

This invention relates to goniometers of the kind in which two field coils are mounted on the same carrying body and are arranged to intersect at right angles.

In prior devices one field coil is wound directly on the carrying body while the other field coil is wound around the former coil. Consequently, the space enclosed by the former or lower coil is smaller than the space enclosed by the second or upper coil. As a result a quadrantal error arises that may amount to ±0.75° according to the thickness of the wires.

The invention described hereafter aims to avoid this error.

According to the invention the field coils are arranged to enclose each a space of substantially the same volume.

Figure 1:
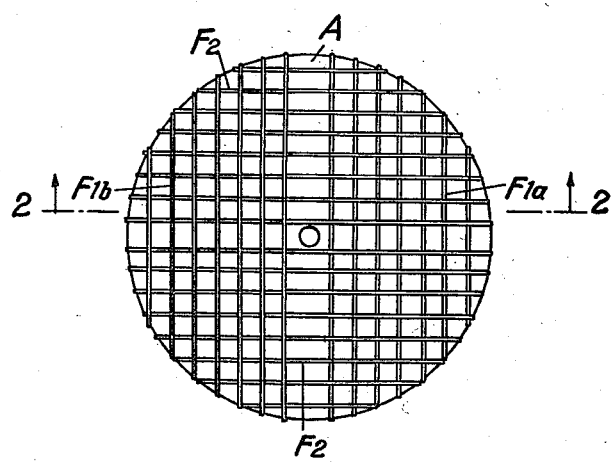
Figure 2:
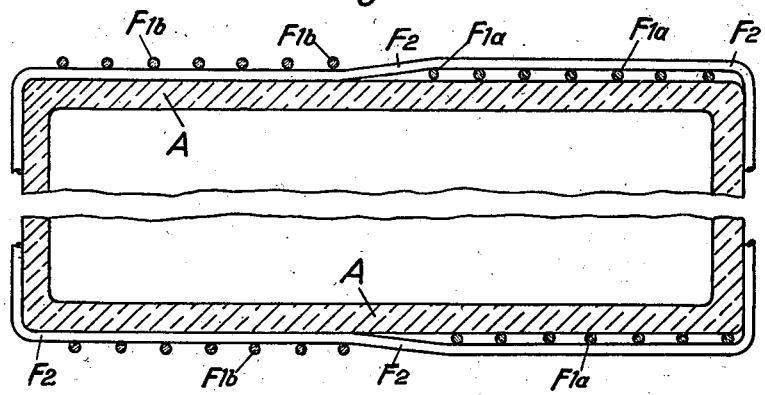

In the drawing, Fig. 1 is a diagrammatic end view of one embodiment of the invention, Fig. 2 shows a fragmentary section taken on line 2—2 and drawn to a scale larger than that of Fig. 1.

One field coil is divided into halves $F_{1a}$ and $F_{1b}$. The other field coil is designated $F_2$. The half coil $F_{1a}$ is located below coil $F_2$ while half coil $F_{1b}$ is located above $F_2$. In this way the space enclosed by the field coil composed of the parts $F_{1a}$, $F_{1b}$ is substantially of the same volume as that enclosed by the coil $F_2$. No quadrantal error can hence arise. A denotes a cylindrical body carrying the field coils.

What is claimed is:

A goniometer field coil arrangement comprising a pair of angularly related field coils wound on a former, one of said field coils being divided into two substantially equal parts, one of said parts being wound on said former inside the winding of the other field coil and the other of said parts being wound outside the windings of said other field coil whereby, said field coils enclose substantially the same volume.

KARL-GEORG HOLSTEN.